(12) United States Patent
Bieker et al.

(10) Patent No.: US 9,366,272 B2
(45) Date of Patent: Jun. 14, 2016

(54) HYDRAULIC SYSTEM HAVING LOW SPEED OPERATION

(71) Applicant: Caterpillar Inc., Peoria, IL (US)

(72) Inventors: Susan E. Bieker, Minooka, IL (US); Eric P. Jakubiak, Aurora, IL (US); Dennis R. Barber, Plainfield, IL (US); John J. Kaufman, Yorkville, IL (US); Edward W. Mate, Manhattan, IL (US); Scott D. Vollmer, Naperville, IL (US); Michael D. Hudson, Mount Zion, IL (US); Moses I. Akpan, Moline, IL (US)

(73) Assignee: Caterpillar Inc., Peoria, IL (US)

( * ) Notice: Subject to any disclaimer, the term of this patent is extended or adjusted under 35 U.S.C. 154(b) by 379 days.

(21) Appl. No.: 13/963,150

(22) Filed: Aug. 9, 2013

(65) Prior Publication Data

US 2015/0040548 A1    Feb. 12, 2015

(51) Int. Cl.
*F15B 15/02*    (2006.01)
*E02F 9/08*    (2006.01)
(Continued)

(52) U.S. Cl.
CPC .............. *F15B 15/02* (2013.01); *E02F 9/0866* (2013.01); *E02F 9/0875* (2013.01); *E02F 9/226* (2013.01); *F16H 61/433* (2013.01); *F16H 61/465* (2013.01); *F01P 7/044* (2013.01); *F15B 2211/40515* (2013.01); *F15B 2211/40592* (2013.01); *F15B 2211/41581* (2013.01); *F15B 2211/46* (2013.01); *F15B 2211/50509* (2013.01); *F15B 2211/605* (2013.01)

(58) Field of Classification Search
CPC ....... E02F 9/0866; E02F 9/0875; E02F 9/226; F16D 2300/021; F16D 2300/0212; F16D 2300/0214; F16D 13/72; F16D 25/123; F16H 61/4165; F16H 61/45; F16H 61/04; F16H 57/04157; F16H 61/465; F16H 61/433; F15B 2211/40515; F15B 2211/40592; F15B 2211/41581; F15B 2211/46; F15B 2211/50545; F15B 2211/5159; F15B 2211/605; F15B 2211/50509; F15B 15/02; F01P 7/044
USPC .................................................... 60/450, 445
See application file for complete search history.

(56) References Cited

U.S. PATENT DOCUMENTS 2,484,916 A    10/1949    Tucker
6,062,332 A *    5/2000    Stephenson ............ B60K 17/10
                                                                    180/305

(Continued)

FOREIGN PATENT DOCUMENTS

JP    05024445    2/1993
JP    05178223    7/1993

(Continued)

*Primary Examiner* — Nathaniel Wiehe
*Assistant Examiner* — Logan Kraft
(74) *Attorney, Agent, or Firm* — Edward Lin

(57) ABSTRACT

A hydraulic fan circuit is provided. The hydraulic fan circuit includes a tank, a motor having a fluid inlet and a fluid outlet and a pump to draw fluid at a low pressure from the tank and discharge the fluid at elevated pressures to the motor via the fluid inlet. The hydraulic fan circuit further includes a directional control valve disposed between the fluid outlet of the motor and the tank. The directional control valve is operable to move between a flow blocking position and a flow passing position. Further, the directional control valve is configured to reduce a positive speed of the motor below a lowest positive speed attainable through control of pump output. Furthermore, the hydraulic fan circuit includes a pressure control circuit configured to provide a pilot fluid flow at varying pressure to move the directional control valve.

18 Claims, 3 Drawing Sheets

(51) Int. Cl.
    *E02F 9/22*     (2006.01)
    *F16H 61/433*     (2010.01)
    *F16H 61/465*     (2010.01)
    *F01P 7/04*     (2006.01)

(56) References Cited

U.S. PATENT DOCUMENTS

| | | |
|---|---|---|
| 6,195,990 B1 | 3/2001 | Machesney et al. |
| 6,959,671 B2 | 11/2005 | Nakagawa et al. |
| 7,055,318 B2 * | 6/2006 | Perry .................. F03C 1/003 60/426 |
| 7,421,840 B2 | 9/2008 | Rose |
| 7,523,610 B2 * | 4/2009 | Sakikawa ............ F16D 31/00 60/468 |
| 8,024,924 B2 | 9/2011 | Mueller et al. |
| 2011/0014062 A1 | 1/2011 | Imaizumi et al. |

FOREIGN PATENT DOCUMENTS

| | | |
|---|---|---|
| JP | 2002349262 | 12/2002 |
| JP | 2003176554 | 6/2003 |
| JP | 2009162350 | 7/2009 |
| JP | 2010169112 | 8/2010 |

* cited by examiner

HYDRAULIC SYSTEM HAVING LOW SPEED OPERATION

TECHNICAL FIELD

The present disclosure relates to a hydraulic system, and particularly to a hydraulic system having low speed operation, for example, for use in a hydraulic fan circuit for a fan associated with an engine of a machine.

BACKGROUND

Hydraulic systems having hydraulically operated pump and motor are generally operated at high speed or completely turned off as and when desired. For example, engine driven machines such as on-highway trucks, dozers, loaders, excavators etc., include hydraulic systems to cool down the engine temperatures that may have risen during operation. These cooling systems typically include a fan for cooling the engine. However, in situations, where the atmospheric temperature is very low, the engine might not be required to be cooled very much. In fact, a condition of overcooling may be detected in such situations, which is undesirable. Therefore, to prevent the overcooling, the motor may be turned off.

SUMMARY

In one aspect, a hydraulic fan circuit is provided. The hydraulic fan circuit includes a tank, a motor having a fluid inlet and a fluid outlet and a pump to draw fluid at a low pressure from the tank and discharge the fluid at elevated pressures to the motor via the fluid inlet. The hydraulic fan circuit further includes a directional control valve disposed between the fluid outlet of the motor and the tank. The directional control valve is operable to move between a flow blocking position and a flow passing position. Further, the directional control valve is configured to reduce a positive speed of the motor below a lowest positive speed attainable through control of pump output. Furthermore, the hydraulic fan circuit includes a pressure control circuit configured to provide a pilot fluid flow at varying pressure to move the directional control valve.

In another aspect, a method of operating a motor fluidly coupled to a pump in a hydraulic fan circuit associated with a power source is provided. The method includes detecting an operational parameter associated with the power source. Further, the method includes generating a pilot flow by a pressure control circuit based on the detected operational parameter. The method includes simultaneously operating a directional control valve disposed downstream to the motor to selectively increase a back pressure on the motor and adjusting a displacement of the pump to a first displacement position by the pilot flow from the pressure control circuit.

DETAILED DESCRIPTION

Figure 1:
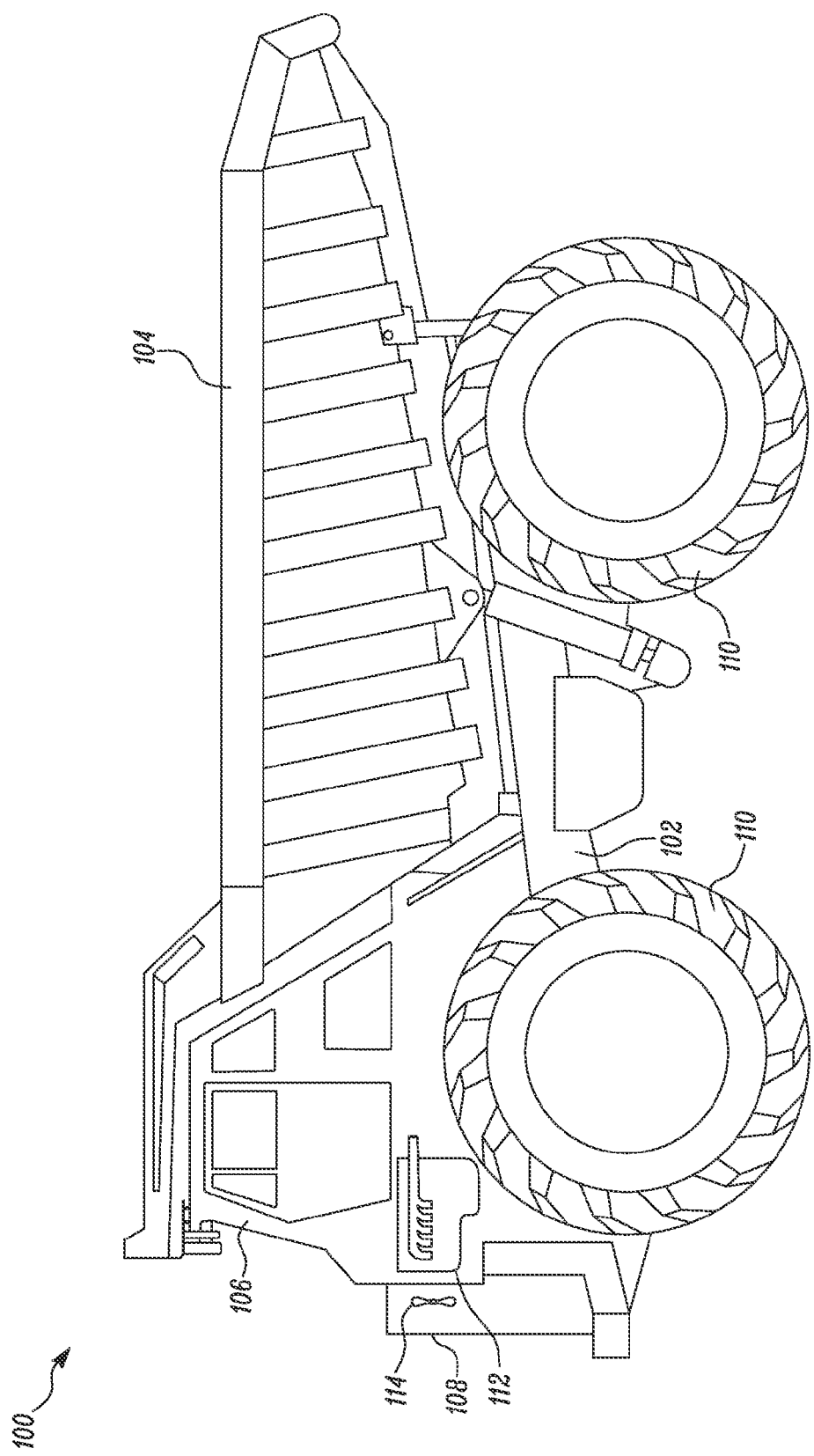
FIG. 1 illustrates a schematic view of an exemplary machine.

The present disclosure relates to a hydraulic system having low speed operation, for example a hydraulic fan circuit for a fan used for cooling various fluid systems such as the one associated with an engine of a machine. FIG. 1 illustrates an exemplary machine 100, according to an embodiment of the present disclosure. As illustrated in FIG. 1, the machine 100 may be embodied as a large mining truck. In various other aspects, the machine 100 may be an off-highway truck, a dozer, a motor grader, a wheel loader or any other machine which may perform various operations associated with an industry such as mining, construction, farming, transportation, or any other industry known in the art. Moreover, the machine 100 may be embodied as, such as a generator set or a pumping mechanism.

Referring to FIG. 1, the machine 100 may include a frame 102. A payload carrier 104 may be pivotally supported on the frame 102. Further, an operator cab 106 may be mounted to the frame 102, such as above an engine enclosure 108 and on a front part of the frame 102. The machine 100 may be supported on the ground by a plurality of ground engaging members 110, such as wheels. One or more power sources 112 may be housed within the engine enclosure 108 that provides power to one or more onboard hydraulic systems (e.g., to a cooling system, a drive system, a tool system, a lubrication system, etc.). The power source 112 may be a diesel engine, a gasoline engine, a gaseous fuel-powered engine, a hydrogen-powered engine, or any other type of combustion engine known in the art. Alternatively, the power source 112 may be a non-combustion source of power such as a fuel cell, a power storage device, a solar cell, or another suitable source of power. The power source 112 may produce mechanical and/or electrical power output, which may be converted to hydraulic power in the form of pressurized fluid.

Further, the machine 100 may include one or more powered components operatively connected to the power source 112. The power source 112 may provide rotational power to the powered components. In an exemplary aspect, one of the powered components may be a hydraulic system such as a hydraulic fan circuit for a fan 114 associated with the power source 112.

Figure 2:
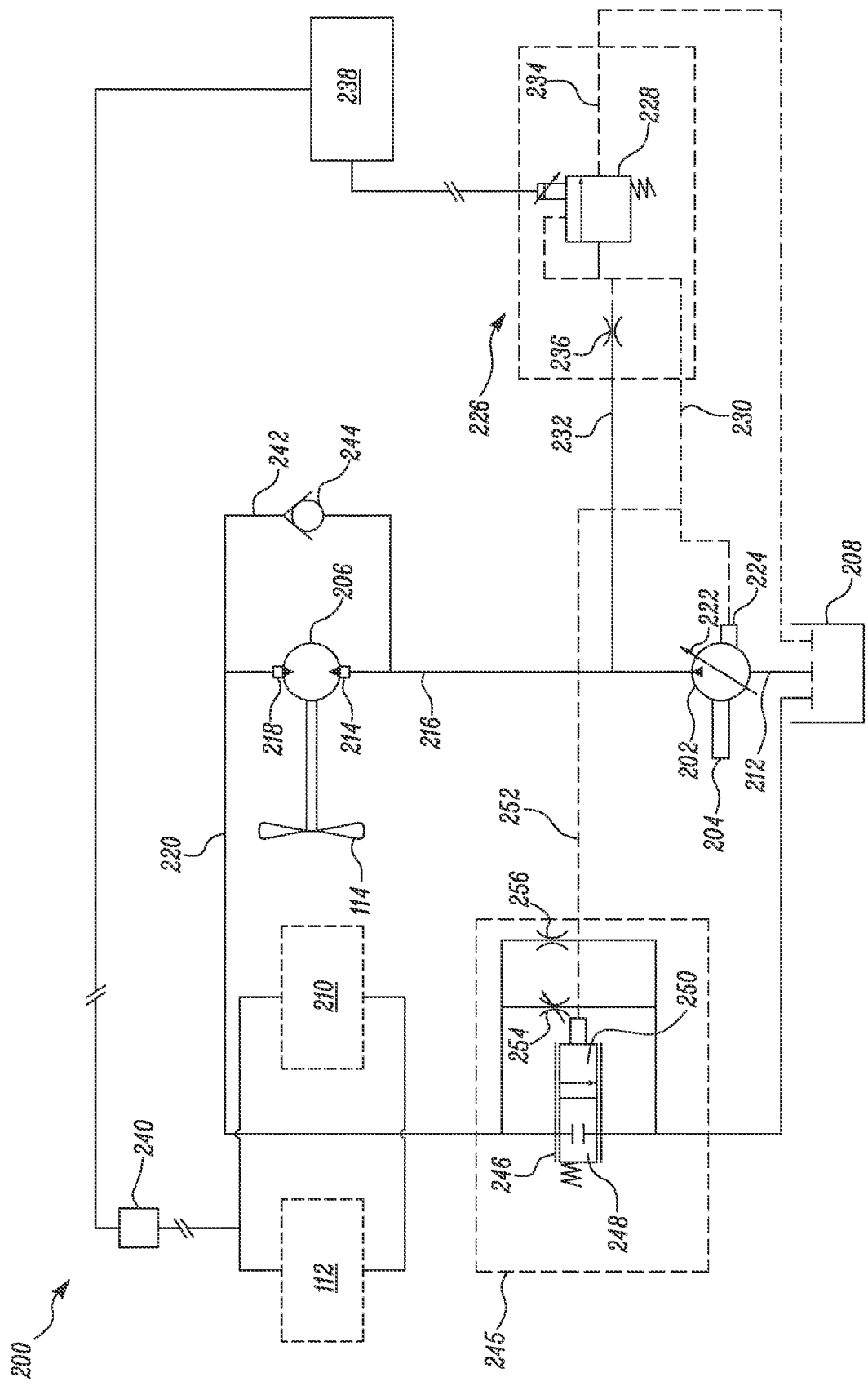
FIG. 2 illustrates a schematic view of a hydraulic fan circuit for a fan associated with a power source of the machine of FIG. 1, according to an embodiment of the present disclosure.

FIG. 2 illustrates an exemplary hydraulic fan circuit 200 for cooling the power source 112. In an aspect of the present disclosure, the hydraulic fan circuit 200 may include a pump 202 mechanically connected directly to an output shaft 204 of the power source 112, a motor 206 fluidly connected to the pump 202, and the fan 114 is mechanically connected to and driven by the motor 206. The power source 112 may drive the pump 202 via the output shaft 204 to draw in low-pressure fluid from a tank 208 and discharge the fluid at an elevated pressure. The motor 206 receives and converts the pressurized fluid to mechanical power that drives the fan 114 to generate a flow of air. The flow of air may be used to cool the power source 112 directly and/or indirectly by way of a heat exchanger 210, as desired.

In an exemplary embodiment, the pump 202 may embody a rotary or piston-driven pump having a crankshaft (not shown) connected to the power source 112 via the output shaft 204 such that a rotation of the output shaft 204 results in a corresponding pumping motion of the pump 202. The pumping motion of the pump 202 may function to draw in the low-pressure fluid from the tank 208 via a low-pressure passage 212, and discharge the fluid at the elevated pressure to the motor 206 via a fluid inlet 214 and through a high-pressure passage 216. After passing through the motor 206, the fluid may return to the tank 208 via a fluid outlet 218 and through a drain passage 220. The low-pressure passage 212, the high-pressure passage 216, and the drain passage 220 together may form an open hydraulic circuit. The pump 202 may be dedicated to supply the pressurized fluid to only the motor 206 via the high-pressure passage 216 or, alternatively, may also supply the pressurized fluid to other hydraulic circuits associated with the machine 100 (e.g., to the hydraulic circuits associated with the implement system, the drive system, the lubrication system, etc.), if desired. Similarly, the pump 202 may be dedicated to draw the low-pressure fluid from only the tank 208 via the low-pressure passage 212 or, alternatively, may also draw the low-pressure fluid from other tanks and/or circuits of the machine 100, if desired.

In the particular embodiment of FIG. 2, the pump 202 includes a unidirectional, variable-displacement hydraulic pump equipped with a stroke-adjusting mechanism 222, for example a swash plate, a position of which is hydro-mechanically adjusted based on, among other things, a desired speed of the fan 114 (or a desired cooling of the power source 112 facilitated by the fan 114) to thereby vary an output (e.g., a discharge rate) of the pump 202. Using the stroke-adjusting mechanism 222, the displacement of the pump 202 may be adjusted between a first displacement position and a second displacement position. The first displacement position may correspond to a displacement at which the pump 202 operates at a standby mode with a lowest flow rate and a lowest discharge pressure, and the second displacement position may correspond to a displacement at which the pump 202 operates at full-load mode with a high flow rate and a high discharge pressure.

In accordance with an aspect of the present disclosure, the pump 202 may be a load sensing type pump including a pump compensator 224, and a pressure control circuit 226 (alternatively known as a load sense circuit). In an embodiment, the pump compensator 224 may be a pump pressure discharge type pump compensator, which is in fluid communication with the pressure control circuit 226 via a first passage 230. As a result, the pump 202 operates at the low discharge pressure when the pilot pressure in the first passage 230 is low and the pump 202 operates at the high discharge pressure when a pilot pressure in the first passage 230 is high. The pump compensator 224 may be associated with the stroke-adjusting mechanism 222 and configured to move the stroke-adjusting mechanism 222. Further, the pump compensator 224 may be spring biased towards the first displacement position corresponding to the standby mode of the pump 202.

In an aspect of the present disclosure, the pressure control circuit 226 may include a solenoid operated valve arrangement 228, for example a relief valve, which is configured to adjust a pilot fluid flow in the first passage 230. Further, a restricted orifice 236 may be disposed within a second passage 232 at a location between the solenoid operated valve arrangement 228 and the high-pressure passage 216. The orifice 236 is configured to hydraulically create a signal divider network using the solenoid operated valve arrangement 228. In the illustrated embodiment, the orifice 236 is shown as a fixed orifice, alternatively a variable orifice with a needle may be also used. The pilot fluid flow in the first passage 230 nears the discharge pressure of the pump 202 when the solenoid operated valve arrangement 228 is in a closed position and the pilot fluid flow in the first passage 230 nears a tank pressure when the solenoid operated valve arrangement 228 is in a full-open position via a third passage 234. It will be apparent to a person having ordinary skill in the art that the pressure control circuit 226 is used to limit a maximum pump discharge pressure with a pre-defined range governed by spring settings of the solenoid operated valve arrangement 228.

The solenoid operated valve arrangement 228 may be energized by a controller 238 to adjust the pilot fluid flow to operate the pump compensator 224. The controller 238 may be embodied as a single or multiple microprocessors, field programmable gate arrays (FPGAs), digital signal processors (DSPs), etc. that includes a means for controlling an operation of the hydraulic fan circuit 200 in response to the signals received from one or more sensors. Numerous commercially available microprocessors can be configured to perform the functions of the controller 238. It may be appreciated that the controller 238 may embody a microprocessor separate from that controlling other machine-related functions, or that the controller 238 could be integral with a machine microprocessor and be capable of controlling numerous machine functions and modes of operation. If separate from the general machine microprocessor, the controller 238 may communicate with the general machine microprocessor via data links or other known methods. Various other known circuits may be associated with the controller 238, including power supply circuitry, signal-conditioning circuitry, actuator driver circuitry (i.e., circuit powering solenoids, motors, or piezo actuators), and communication circuitry.

In an embodiment, the pressure control circuit 226 includes an operational parameter sensor 240 configured to detect an operational parameter associated with the power source 112. In an exemplary embodiment, the operational parameter may include a temperature associated with the power source 112. The sensor 240 may be configured to generate one or more signals indicative of the operational parameter such as the temperature associated with the power source 112. In the illustrated embodiment, the temperature associated with the power source 112 may include coolant temperature circulating between the power source 112 and the heat exchanger 210. Alternatively, the temperature associated with the power source 112 may also include, lubricating oil temperatures, engine block temperatures, exhaust temperatures, boost temperatures, ambient air temperatures, or other temperatures. The sensor 240 may direct the signals to the controller 238 for further processing.

The motor 206 may include a fixed- or variable-displacement, rotary- or piston-type hydraulic motor that is movable by an imbalance of pressures acting on a driven element (not shown), for example on an impeller or a piston. The pressurized fluid from the pump 202 may be directed into the motor 206 via the high-pressure passage 216 and returned from the motor 206 to the tank 208 via the drain passage 220. The direction of the pressurized fluid to one side of the driven element and the draining of the fluid from an opposing side of the driven element may create a pressure differential across the driven element that causes the driven element to move or rotate. The direction and rate of fluid flow through the motor 206 may determine the rotational direction and speed of the motor 206 and the fan 114, while the pressure imbalance across the driven element may determine the torque output.

Further, an anti-cavitation passage 242 having a check valve 244 may be disposed in parallel relationship with the motor 206 and configured to connect the drain passage 220 (i.e., the fluid outlet 218) directly with the high-pressure passage 216 (i.e., the fluid inlet 214). In particular, there may be some situations where the fan 114 drives the motor 206 to move faster than otherwise possible for a given flow of the fluid entering the motor 206. These situations may occur, for example, during slowdown of the motor 206. When the motor 206 is driven by the fan 114, the motor 206 may act like a pump and generate a pressure output greater than a pressure input. If left unchecked, this could cause the motor 206 to cavitate. The anti-cavitation passage 242, however, may allow the discharge of the motor 206 to circulate back to the fluid inlet 214 when a pressure at the fluid outlet 218 is greater than the pressure at the fluid inlet 214, thereby helping to reduce the likelihood of cavitation.

In an aspect of the present disclosure, the hydraulic fan circuit 200 includes a low speed valve arrangement 245 configured to reduce a positive speed of the motor below a lowest positive speed attainable through the control of the output of the pump 202 while allowing the pump 202 and the motor 206 to run at a minimum required pressure. The low speed valve arrangement 245 includes a directional control valve 246 disposed between the fluid outlet 218 of the motor 206 and the tank 208. In one example, the directional control valve 246 may be a two-way, two position valve and operable to move between a flow blocking position 248 and a flow passing position 250. According to an aspect of the present disclosure, the pressure control circuit 226 is configured to provide the pilot fluid flow at a varying pressure to move the directional control valve 246 between the flow blocking position 248 and the flow passing position 250. Further, as illustrated in FIG. 2, the directional control valve 246 is movable from the default spring bias position (i.e. the blocking position 248) as the pilot fluid flow increases in the first passage 230, and thus in a pilot fluid passage 252, above a threshold pressure value the pilot pressure is sufficient to move the directional control valve 246 to the passing position 250.

As described above, the controller 238 may be used to adjust a displacement of the pump 202, thereby changing a speed of the motor 206, the fan 114 and a resulting cooling of the power source 112. In some situations, however, this control over the fan speed may be insufficient to meet desired conditions of the power source 112. For example, a minimum positive speed of the fan 114 achievable through the pump control may be about 400-500 rpm, which may not be slow enough for some applications (e.g., during overnight idling in extremely low ambient temperatures which may cause overcooling of the power source 112). In these applications, an additional way to reduce fan speed even lower may be desired. For this reason, the controller 238 may be configured to selectively activate a near-zero speed mode of operation of the motor 206 when necessary (e.g. about 10-100 rpm).

To activate the near-zero speed mode of operation, the controller 238 may process the signals from the sensor 240, which may be indicative of the temperature associated with the power source 112, to selectively generate an input signal indicative of an overcooling condition associated with the power source 112. In an exemplary embodiment, the controller 238 may include a pre-defined data set such as a look-up table, an array or a module map/function to compare the signals from the sensors 240 to detect the overcooling condition. The controller 238 may be further configured to move the solenoid operated valve arrangement 228 to a desired position based on the operational parameter. For example, the input signal from the controller 238 is directed to the solenoid operated valve arrangement 228 to move the solenoid operated valve arrangement 228 to the open position and reduce the pilot fluid flow pressure below the threshold pressure value in the first passage 230, when the overcooling condition is detected. Thus, the pump 202 moves to the first displacement position corresponding to the standby mode that maintains the low discharge pressure in the high pressure passage 216. The low discharge pressure provides a minimum control torque to the motor 206. Further, the fan 114 characteristics determine the minimum speed of the fan 114, for the given standby mode of the pump 202, which corresponds to 400-500 rpm. Similarly, below the threshold pressure value, the pilot fluid flow may allow the directional control valve 246 to move using the spring action to the flow blocking position 248. Therefore, the directional control valve 246 reduces the positive speed of the motor below the lowest positive speed attainable through the control of the output of the pump 202. In an alternative embodiment, the directional control valve 246 may be a solenoid operated valve, and the controller 238 may monitor the pressure in the first passage 230 when the overcooling condition is detected to selectively control the directional control valve 246 based on the discharge pressure associated with the pump 202. In a yet another embodiment, the pressure control circuit 226 may be combined with the pump 202 to form an electro hydraulic type pump system. Therefore, in this case, the electro hydraulic type pump system may send the pilot fluid flow to operate the directional control valve 246. In a yet another embodiment, the controller may monitor the pressure in the first passage 230 when the overcooling condition is detected, to selectively control the solenoid operated directional control valve 246 based on a discharge pressure associated with the electro hydraulic type pump system. Alternatively, the directional control valve 245 may be controlled by an independent pilot system and an electronic signal with associated software.

In an aspect of the present disclosure, the hydraulic fan circuit 200 may further include a variable orifice 254 disposed in a parallel relationship with the directional control valve 246. When the directional control valve 246 is in the flow passing position 250 during normal operations, there may be little or no affect on the operation of the hydraulic fan circuit 200 (i.e., the fan 114 speed may remain unaffected) and all the discharge from the motor 206 may pass through the drain passage 220. However, during the near-zero speed mode of operation, the controller 238 may selectively cause the directional control valve 246 to move to the flow blocking position 248, thereby blocking the drain passage 220 and causing all the discharge from the motor 206 to pass through the variable orifice 254. In an embodiment, the variable orifice 254 may be a needle valve having a screw plunger to precisely regulate the flow rate and achieve desired gradations in the near-zero speed mode of operation. In an embodiment, the desired flow rate of fluid may be reduced such as about 3-4 L/m resulting in a reduced fan speed of about 10-100 rpm. Moreover, a fixed orifice 256 is disposed in parallel relationship with the directional control valve 246 and the variable orifice 254, such that the fixed orifice 256 prevents complete blockage of the drain passage 220.

INDUSTRIAL APPLICABILITY

The industrial applicability of the hydraulic fan circuit 200 for the fan 114 associated with the power source 112 of the machine 100, described herein will be readily appreciated from the foregoing discussion.

Generally, engine driven machines include a cooling system to cool down the engine temperatures that may have risen during operation. These cooling systems typically include a fan for cooling the engine. However, in situations, where the atmospheric temperature is very low, the engine might not be required to be cooled very much. In fact, a condition of overcooling may be detected in such situations, which is undesirable. Therefore, to prevent the overcooling, the speed of the fan needs to be controlled. One way to prevent over cooling of the engine is to shut down the fan in such situations. However, it is not feasible to completely shut off the fan as these fans are hydraulically controlled by a hydraulic system which also controls other hydraulic operations associated with the machine. Therefore, shutting the fan off may also hamper the operation of the other hydraulic operations of the machine. Furthermore, completely shutting off the fan may result in cold temperature of the fan circuit, whereas other portion of the hydraulic circuit may be at high temperature. Therefore, on restarting the fan, the interaction of the hot hydraulic fluid with the cold hydraulic fan circuit, a condition of thermal shock and/or thermal lock between the moving parts of the hydraulic systems may be encountered, which may further result in damage of these parts. Completely turning off the fan can also allow other systems of the machine to heat up since the same airflow passes through cores which are used to cool other systems. Also, the fan speed cannot be brought to an extremely low speed due to minimum pressure requirements on the pump output.

The hydraulic fan circuit 200 of the present disclosure is configured to operate the motor 206 and the fan 114 at a near-zero speed mode of operation in order to prevent the overcooling of the power source 112. The controller 238 controls the pressure control circuit 226 to simultaneously reduce the pilot fluid flow to the pump compensator 224 to move the pump 202 to operate at the standby mode with the low discharge pressure, to move the directional control valve 246 to the flow blocking position 248 using the spring. Therefore, the directional control valve 246 is configured to selectively increase a back pressure on the motor 206 to reduce the positive speed of the motor 206 below the lowest positive speed attainable through the control of the pump output. In an exemplary aspect of the present disclosure, the directional control valve 246 reduces the fan speed to a near-zero speed, i.e., 10-100 rpm. Reducing the fan 114 speed to near-zero may prevent the overcooling of the power source 112, without shutting the fan 114 completely off, as done conventionally.

Figure 3:
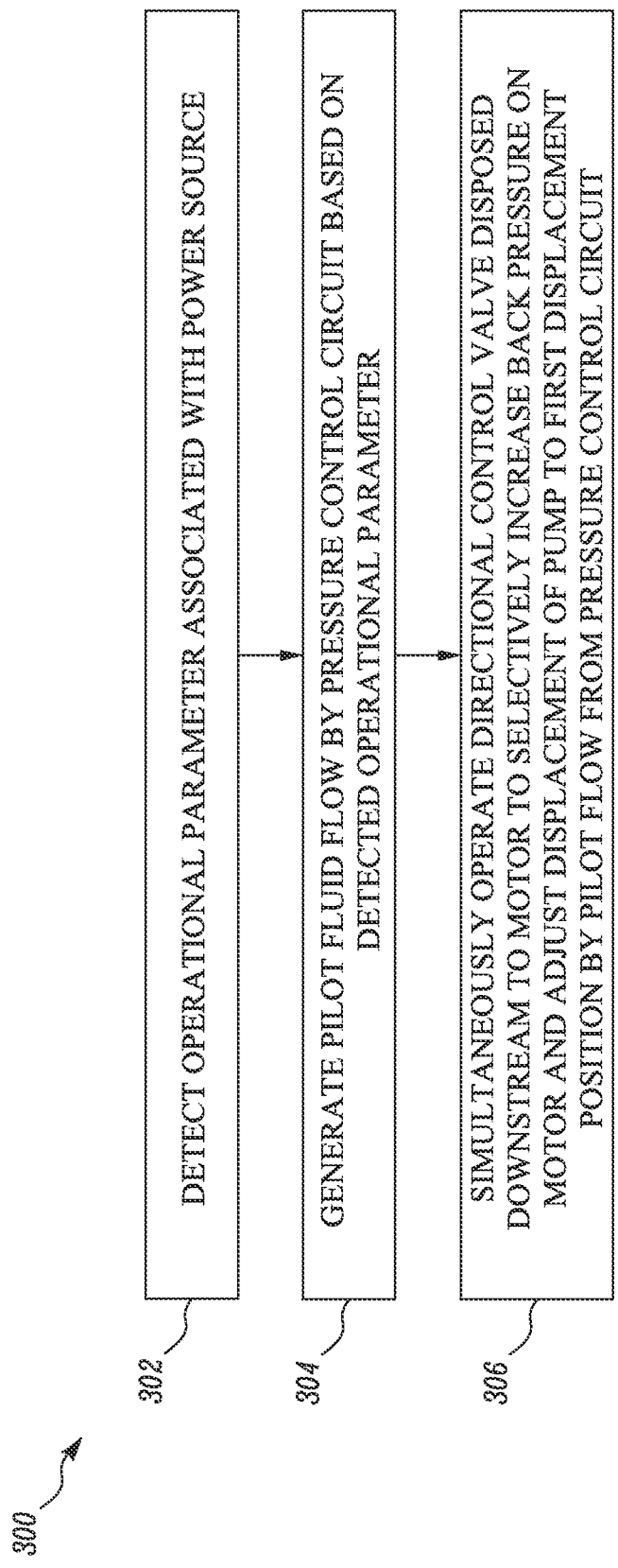
FIG. 3 illustrates an exemplary method of operating the hydraulic fan circuit during near-zero speed mode of operation.

FIG. 3 illustrates a flowchart of a method 300 of operating the hydraulic fan circuit 200 during near-zero speed mode of operation. At step 302, the operational parameter associated with the power source 112 is detected. In an exemplary embodiment, the operational parameter is the temperature associated with the power source 112. In an aspect of the present disclosure, the operational parameter sensor 240 is configured to detect the operational parameter associated with the power source 112 and direct the signal indicative of the temperature to the controller 238. Further, signals are processed by the controller 238 to selectively generate an input signal indicative of the over cooling condition associated with the power source 112. Furthermore, the input signal from the controller 238 is directed to the solenoid operated valve arrangement 228 of the pressure control circuit 226.

At step 304, a pilot fluid flow is generated by the pressure control circuit 226 based on the detected operational parameter. In an aspect of the present disclosure, the solenoid operated valve arrangement 228 is moved to the open position based on the input signal received from the controller 238 which is indicative of the overcooling condition of the power source 112. Further, the pilot fluid flow pressure is reduced below the threshold pressure value in the first passage 230 by the open position of the solenoid operated valve arrangement 228.

Furthermore, at step 306, simultaneously the directional control valve 246 is operated to selectively increase the back pressure on the motor 206 and the displacement of the pump 202 is adjusted to the first displacement position by the pilot fluid flow from the pressure control circuit 226. The first displacement position of the pump 202 corresponds to the stand by mode that maintains the low discharge pressure in the high pressure passage 216 and thereby reducing the torque provided to the motor 206 resulting in reduced fan speed. Furthermore, below the threshold pressure value, the pilot fluid flow allows the directional control valve 246 to be moved using the spring action to the flow blocking position 248. Once, the directional control valve 246 is switched to the flow blocking position 248, the drain passage 220 is blocked, causing the discharge from the motor 206 to flow through the variable orifice 254 and the fixed orifice 256 disposed in parallel relationship with the directional control valve 246. Blocking of the drain passage 220 increases the back pressure on the motor 206 thereby further reducing the speed of the fan 114. However, the variable orifice 254 may be adjusted accordingly to prevent the motor 206 from completely shutting down and maintaining the speed of the motor 206 and the fan 114 to approximately 10-100 rpm, thereby attaining the lower than the lowest positive speed of the motor 206 attainable through the control of the pump output.

While aspects of the present disclosure have been particularly shown and described with reference to the embodiments above, it will be understood by those skilled in the art that various additional embodiments may be contemplated by the modification of the disclosed systems and methods without departing from the spirit and scope of what is disclosed. Such embodiments should be understood to fall within the scope of the present disclosure as determined based upon the claims and any equivalents thereof.

What is claimed is:

1. A hydraulic system comprising:
   a tank;
   a motor having a fluid inlet and a fluid outlet;
   a pump configured to draw fluid at a low pressure from the tank and discharge the fluid at elevated pressures to the motor via the fluid inlet;
   a directional control valve disposed between the fluid outlet of the motor and the tank and operable to move between a flow blocking position and a flow passing position, the directional control valve being configured to reduce a positive speed of the motor below a lowest positive speed attainable through control of pump output;
   a pressure control circuit configured to provide a pilot fluid flow at varying pressure to move the directional control valve;
   a variable orifice disposed in a parallel relationship with the directional control valve; and
   a fixed orifice disposed in a parallel relationship with the directional control valve and with the variable orifice.

2. The hydraulic system of claim 1, wherein the pressure control circuit includes a solenoid operated valve arrangement configured to adjust the pilot fluid flow.

3. The hydraulic system of claim 2, wherein the pressure control circuit includes a sensor configured to detect an operational parameter associated with a power source, a controller in communication with the sensor and the solenoid operated valve arrangement, the controller being configured move the solenoid operated valve arrangement to a desired position based on the operational parameter.

4. The hydraulic system of claim 3, wherein the pump includes a pump compensator configured to receive the pilot fluid flow from the pressure control circuit.

5. The hydraulic system of claim 1, wherein the pump is a variable displacement hydraulic pump configured to be operated by the pilot fluid flow from the pressure control circuit.

6. A machine having the hydraulic system of claim 1.

7. A hydraulic system comprising:
   a tank;
   a motor having a fluid inlet and a fluid outlet;
   a pump configured to draw fluid at a low pressure from the tank and discharge the fluid at elevated pressures to the motor via the fluid inlet;
   a low speed valve arrangement configured to reduce a positive speed of the motor below a lowest positive speed attainable through control of pump output, the low speed valve arrangement including:
- a directional control valve disposed between the fluid outlet of the motor and the tank and operable to move between a flow blocking position and a flow passing position;
- a variable orifice disposed in a parallel relationship with the directional control valve; and
- a fixed orifice disposed in a parallel relationship with the directional control valve and with the variable orifice.

8. The hydraulic system of claim 7, wherein the directional control valve is operable based on a pressure associated with the pump.

9. The hydraulic system of claim 7 further comprising a pressure control circuit having a solenoid operated valve arrangement configured to adjust a pilot fluid flow.

10. The hydraulic system of claim 9, wherein the pressure control circuit adjusts the pilot fluid flow based on an operational parameter associated with a power source.

11. The hydraulic system of claim 10, wherein the operational parameter is a temperature associated with the power source.

12. The hydraulic system of claim 9, wherein the pump is a variable displacement hydraulic pump configured to be operated by the pilot fluid flow from the pressure control circuit.

13. The hydraulic system of claim 9, wherein the pump includes a stroke adjusting mechanism and a pump compensator associated with the stroke adjusting mechanism wherein the pump compensator is configured to receive the pilot flow from the pressure control circuit.

14. A machine having the hydraulic system of claim 7.

15. A method of operating a motor fluidly coupled to a pump in a hydraulic system, the hydraulic system is associated with a power source, the method comprising:
- detecting an operational parameter associated with the power source;
- generating a pilot fluid flow by a pressure control circuit based on the detected operational parameter; and
- simultaneously operating a directional control valve disposed downstream to the motor to selectively increase a back pressure on the motor and adjusting a displacement of the pump to a first displacement position by the pilot flow from the pressure control circuit.

16. The method of claim 15, wherein generating a pilot fluid flow further includes receiving an input signal by a solenoid operated valve arrangement of the pressure control circuit, the input signal indicative of an over cooling condition associated with the power source.

17. The method of claim 15, wherein operating the directional control valve further includes selectively allowing a fluid flow through a variable orifice disposed in parallel relationship with the directional control valve.

18. The method of claim 17, wherein operating the directional control valve further includes selectively allowing a fluid flow through a fixed orifice disposed in a parallel relationship with the directional valve and with the variable orifice.

* * * * *